United States Patent [19]

Chevallier

[11] Patent Number: 5,236,623

[45] Date of Patent: * Aug. 17, 1993

[54] PROCESS FOR THE PRODUCTION OF A SILICA COLLOID

[75] Inventor: Yvonick Chevallier, Decines, France

[73] Assignee: Rhone-Poulenc Chimie, Courbevoie Cedex, France

[*] Notice: The portion of the term of this patent subsequent to Nov. 19, 2008 has been disclaimed.

[21] Appl. No.: 626,243

[22] Filed: Dec. 12, 1990

Related U.S. Application Data

[63] Continuation of Ser. No. 339,921, Apr. 19, 1989, abandoned, which is a continuation of Ser. No. 1,439, Jan. 8, 1987, abandoned, which is a continuation-in-part of Ser. No. 754,014, Jul. 11, 1985, abandoned.

[30] Foreign Application Priority Data

Jul. 11, 1984 [FR] France ................. 84-11003

[51] Int. Cl.$^5$ .................. B01J 13/00; C01B 33/143
[52] U.S. Cl. .................. 252/313.2; 252/315.6; 423/339
[58] Field of Search .................. 252/313.2, 315.6; 423/339

[56] References Cited

U.S. PATENT DOCUMENTS

| | | | |
|---|---|---|---|
| 2,466,842 | 4/1949 | Elston | 252/313.2 |
| 2,577,485 | 12/1951 | Rule | 252/313.2 |
| 2,871,099 | 1/1959 | Ziese | 252/315.6 X |
| 2,956,957 | 10/1960 | Armstrong et al. | 252/313.2 |
| 3,337,299 | 8/1967 | Burke, Jr. | 252/313.2 X |
| 3,480,390 | 11/1969 | Reinhardt | 423/339 |
| 3,954,944 | 5/1976 | Aldcroft et al. | 423/335 |
| 4,127,641 | 11/1978 | Aldcroft et al. | 423/339 |
| 4,144,321 | 3/1979 | Wason | 424/49 |
| 4,191,742 | 3/1980 | Wason et al. | 424/49 |
| 4,356,107 | 10/1982 | Payne | 252/313.2 |
| 4,590,052 | 5/1986 | Chevallier et al. | 423/335 |
| 5,066,420 | 11/1991 | Chevallier | 252/313.2 |

OTHER PUBLICATIONS

Iler, The Chemistry of Silica, pp. 174–177 (1979).

*Primary Examiner*—Richard D. Lovering
*Attorney, Agent, or Firm*—Finnegan, Henderson, Farabow, Garrett & Dunner

[57] ABSTRACT

Silica colloids having a spherical form, a mean diameter of between about 10 and 100 nm and a polydispersity index between about 1 and 4. A process for making silica colloids is also provided comprising a) forming a reaction medium by simultaneously adding an acidifying agent and an alkaline silicate solution to a reaction vessel, b) reacting the acidifying agent and alkaline silicate solution, and c) maintaining a constant volume of the reaction medium by drawing off the reaction medium.

19 Claims, No Drawings

PROCESS FOR THE PRODUCTION OF A SILICA COLLOID

This application is a continuation of application Ser. No. 07/339,921, filed Apr. 19, 1989, now abandoned, which was a continuation of application Ser. No. 07/001,439, filed Jan. 8, 1987, now abandoned, which was a continuation-in-part of application Ser. No. 06/754,014, filed Jul. 11, 1985, now abandoned.

BACKGROUND OF THE INVENTION

1. Field of the Invention

This invention relates to silicas and silica colloids and products derived from the silica colloid. This invention also concerns a process for the production of silicas and silica colloids.

2. Description of Relevant Art

Precipitation of silica involves a complex array of phenomena involving a number of chemical reactions. Polycondensation and flocculation, which often compete with each other, are particularly important phenomena affecting the characteristics of precipitated silica.

Moreover, the term precipitated silica covers a product which is variable in its morphology. The ultimate particles or elementary pearls of a precipitated silica, for instance, may vary widely in size, shape, and other surface characteristics. Some of these morphological characteristics of silica may be detected with an electron microscope (see Ralph K. Iler - The Chemistry of Silica - John WILEY & Sons (1979) (hereinafter "ILER"), page 465).

Variations in size of ultimate particles of silica may result in different degrees of association among the ultimate particles. As the particles group together, they form aggregates (see ILER - supra at pages 476-477) and groups of weaker bonds. Aggregation results in a wide variety of morphologies of amorphous type silicas. The aggregates may be characterized by their size, their form factor and their surface area.

Thus, there is not one silica but an infinity of silicas, the behavior of which cannot be foreseen, especially as surface chemistry is an important characteristic of silicas which significantly affects their chemical and physical properties.

When producing silicas, it is necessary to consider a large number of parameters affecting the characteristics of the final product, such as the levels of concentration of various reactants, pH value, reaction time, and reaction temperature. Attempts have long been made to isolate the various chemical reactions involved in the formation of silicas and their effect on the final product. U.S. Pat. No. 2,731,326, for instance, discloses first forming a sol by the addition of a solution of sulfuric acid to a silicate solution, then heating the sol in order to increase the size of the particles to about 5 to 7 nm. After particles are formed, a solution of acid and a solution of silicate are simultaneously added, at a constant pH value, to provide for precipitation and to deposit the remainder of the silica on the precipitate (See ILER, supra at page 558).

Similarly, U.S. Pat. Nos. 3,954,944 and 4,127,641 provide for adding simultaneously sulfuric acid and a solution of a sol, maturing the sol, flocculating the sol with the introduction of the alkaline electrolyte, maturing the flocculation product and further adding acid alone or acid and silicate.

It should be understood that the methods of producing silicas are complicated and that the properties of the products themselves are still difficult to appreciate. These problems make it difficult to discern how various production parameters affect the characteristics of the final product. Thus, in spite of efforts which have been made over a long period of time, it has not been possible heretofore to provide a process which isolates the chemical reactions involved in the production of silicas or to control them, even at the level of the starting colloid.

SUMMARY OF THE INVENTION

The process of the present invention comprises forming a reaction medium by simultaneously adding an acidifying agent and an alkaline silicate solution to a reaction vessel. A constant volume of reaction medium is maintained by continuously drawing off the reaction medium while additional reactants in a constant volume are added to the reaction medium.

The present invention also provides a silica colloid having a spherical form, a mean particle diameter of between about 10 and 100 nm and a polydispersity index of between about 1 and 1.2.

The invention further provides a silica colloid having a spherical form, a mean diameter of between about 10 and 100 nm and a polydispersity index greater than about 1.2.

The present invention also includes a distribution of substantially spherical silica balls wherein said spherical silica balls have a mean diameter between about 50 nm to about 300 nm.

DETAILED DESCRIPTION OF THE INVENTION

The term colloid will be used herein to denote sols consisting of fine particles with a very low degree of aggregation in accordance with the definition of colloidal silica given by ILER, at pages 415-418 polydispersity, the ratio of the mean diameter by weight to the mean diameter by number, may be established with procedures well known to those of ordinary skill in the art, such as those described in MYSELS, "Introduction to Colloid Chemistry," Interscience Publisher, (1959) New York, N.Y. The disclosure of the foregoing publication is incorporated herein by reference.

An important factor in determining the morphological characteristics of silica and silica colloids is the residence time in the constant volume reaction medium. It has been found that the size of the particles depends to a large degree on the residence time. Another important factor in determining the characteristics of the product silica is the duration of the reaction.

The process of the present invention comprises reacting a solution of an alkaline silicate with an acidifying agent by forming a heel with an aqueous substance and then effecting, in a continuous mode, simultaneous addition of an acidifying agent and a solution of sodium silicate to form a reaction medium. More particularly, the process of the present invention comprises:

(a) introducing the reactants into a reactor until a stable state (or equilibrium) with regard to the concentration of silica in the reaction vessel is established;

(b) maintaining the stable state by controlling the introduction of the reactants and the removal of reaction medium from the reaction vessel; and (c) filtering, washing and drying the product obtained from the reaction vessel.

The process of the present invention, utilizing a constant volume, unexpectedly provides in the reaction medium a spherical colloid which can be monodisperse with respect to its diameter and, in the drawn-off reaction medium, provides a colloid of silica which is polydisperse with respect to its diameter.

In a simple embodiment, the operation of removing the reaction medium is begun at the commencement of step (a). In this embodiment of the invention, the initial volume of the bottoms material is selected to be equal to the constant volume in the stable operating state.

Unexpectedly, it has been found that the state with a stable concentration of silica establishes itself in a certain period of time after the beginning of the drawing-off operation. It is then sufficient to maintain the stable state by continuing with the continuous feed of the reactants as the reaction medium is drawn-off. When the stable state is reached, there is no longer any difference between the two types of colloids and a polydisperse colloid is obtained, having balls which may be of very large sizes.

In the reaction medium, the silica colloid of the invention may, as shown below in Examples 5 and 6, be polydisperse before the stable state is reached. If so, the polydisperse colloid is more monodisperse, i.e. less polydisperse, than the colloid of silica in the drawn-off reaction medium. As mentioned above, when the stable state is reached, the colloid of silica in the reaction medium is the same as the colloid of silica in the drawn-off reaction medium.

It will, of course, be appreciated that the characteristics of the colloids depend on various parameters as well as the simultaneous addition of reactants and maintenance of a particular volume of reaction medium. The concentration of silica provided by the alkaline silicate added to the reaction medium must be such as to avoid the agglomeration of colloidal particles. In general, the concentration of silica provided by the alkaline silicate is from about 5 g/l to about 50 g/l preferably from about 5 g/l to about 40 g/l. The temperature at which the reaction takes place is advantageously between about 50° and 100° C. The alkaline silicate solution is preferably one of sodium with a ratio by weight (WR) of $SiO_2/Na_2O$ of between about 2 and 4. The acidifying agent may be gaseous, such as $CO_2$, or a liquid, preferably liquid $H_2SO_4$.

The heel material may comprise pure water but a solution of alkaline silicate or a sol may also be used. The initial silicate concentration corresponds to that generally used in the production of precipitated silicas. The temperature and residence time depend on the characteristics of the product which is to be produced. The duration of the reaction and speed of agitation also affect the qualities of the product silica.

The process according to the invention may be carried out very simply in an agitated reactor operating in an overflow mode (provided with an overflow means). It is possible to select any equivalent means and to adapt the reactor depending on the particular form of the reactants (gaseous or liquid).

The present invention also concerns a process for producing silica balls (pearls) or ultimate particles. In the portions of the reaction medium drawn off, a polydisperse colloid is obtained having balls or ultimate particles which may be of very large sizes. When large balls are obtained, a significant fraction of them obtained must be considered as spherical type silica which is particularly suitable for sedimentation. In fact, the present invention results in a variety of novel products, including:

monodisperse colloids with a spherical form factor and a mean diameter of between about 10 and 100 nm and a polydispersity index of between about 1 and 1.2;

polydisperse colloids with a spherical form factor, with a mean diameter of between about 10 and 100 nm, and a polydispersity index of higher than about 1.2 and more particularly between about 1.2 and 4; and silicas which occur in the form of spherical balls of large sizes of generally greater than 50 nm and possibly up to 300 nm, or even greater.

The silica colloids of the present invention may be used for a number of purposes such as those identified in ILER, supra at 419–420, the disclosure of which is incorporated herein by reference.

It will be appreciated by those skilled in the art that the boundary between monodisperse and polydisperse colloids is somewhat arbitrary.

The present invention will be more readily appreciated by reference to the following Examples which illustrate the present invention without limiting it.

The Examples provide for evaluation of the mean diameter by number (dn) and the mean diameter by weight (dw), and polydispersity by the ratio (dw/dn). The parameters dw and dn are calculated as set forth by Joseph T. BAILEY, et al., in "Average Quantities in Colloid Science," Journal of Chemical Education, vol. 39, No. 4, April 1962, pages 196–201. The disclosure of the Bailey article is incorporated herein by reference.

The following Table summarizes the mean residence times, temperatures and reaction times involved in each of the Examples. The following abbreviations are used: "h" is hours; "'" is minute.

| Example | Residence Time(*) | Temperature °C. | Beginning drawing-off (in minutes) | Reaction period |
|---|---|---|---|---|
| 1 | 1 h 10' | 90 | 10' | 1 h to 6 h |
| 2 | 1 h 10' | 90 | 10' | 1 h to 6 h |
| 3 | 1 h 24' | 78 ± 1 | 25' | 1 h to 7 h |
| 4 | 1 h 10' | 80 | 10' | 2 h 30' |
| 5 | 1 h 12' | 80 | 12' | ½ h to 3 h |
| 6 | 1 h | 90 | 1' | ½ h to 4 h |
| 7 | 1 h | 90 | 2' | ½ h to 2 h 30' |
| 8 | 1 h 10' | 90 | 1' | 2 h 30' |
| 9 | 20' | 80 | simultaneously | 1 h |
| 10 | 18' | 75 | simultaneously | 1 h |
| 11 | 30' | 80 | simultaneously | 1 h |
| 12 | 2 h 50' | 90 | 1' | 4 h 30' to 16 h |
| 13 | 20' | 80 | 1' | 4 h to 28 h |
| 14 | 18' | 75 | 1' | 4 h to 100 h |
| 15 | 2 h 50' | 90 | 1' | 24 h to 78 h |
| 16 | 2 h 50' | 90 | 1' | >22 h |

(*) Residence Time equals reaction volume when drawing off the reaction medium is begun divided by sum of flow rates of liquid reactants introduced.

Examples 1 through 8 use a stainless steel reactor with a volume of 20 liters provided with a system for heating by means of a double jacket and an agitation system using a turbine device (400 rpm). The reactor includes a system permitting the reaction liquid to be continuously removed once the volume reaches a fixed reference value. Two metering pumps provide for the feed of the reactants, the aqueous solution of sodium silicate on the one hand and the acid or aqueous solution of acid on the other hand. The two reactants are introduced into the reaction liquid at two separate points.

EXAMPLE 1

Eight liters of distilled water are introduced into the reactor and raised to a temperature of 90° C. Agitation is effected by means of the turbine agitator (speed of rotation 400 rpm). Aqueous sodium silicate with a weight ratio $SiO_2/Na_2O$ of 3.25 and containing 40 g of $SiO_2$ per liter is introduced at a rate of 67 ml per minute to give an aqueous bottoms whose pH value is 9 at 90° C.

The following are simultaneously introduced:

an aqueous solution of sodium silicate in dilute form (weight ratio: $SiO_2/Na_2O$ of 3.25; $[SiO_2]=40$ g/l) at a rate of 67 ml per minute, and an aqueous solution of sulfuric acid in dilute form containing 17 g of $H_2SO_4$ per liter. The rate of introduction of that solution is controlled to maintain the pH value in the reaction medium at $9\pm0.2$ at 90° C. The mean value of the flow rate is 67 ml per minute.

After the two reactants have been simultaneously introduced for a period of 10 minutes, the drawing-off operation is started to maintain a constant volume of 9.3 liters in the reactor. The mean residence time in the reactor is accordingly established at 70 minutes. That procedure thus provides a monodisperse spherical silica colloid (colloid A) and a polydisperse spherical silica colloid (colloid B).

Preparation of Colloid A

Colloid A is present in the reactor. Examination by transmission-type electron microscope and examination by light scattering reveal that this is a monodisperse spherical colloid whose mean diameter varies with the reaction time (determined from the beginning of the operation of simultaneously adding the reactants) in the following fashion, before the stable state is established.

| Reaction Time (hours) | Mean Diameter In Nanometers | | $[SiO_2]$ g/l |
|---|---|---|---|
| | By Number dn | By Weight dw | |
| 1 | 17.5 | 18.3 | |
| 2 | 22.2 | 22.6 | |
| 3 | 30.0 | 31.4 | |
| 4 | 38.3 | 39.3 | |
| 5 | 50.0 | 51.6 | |
| 6 | 62.1 | 62.9 | 23.5 |

Preparation of Colloid B

The reaction liquid which is drawn off for a period of 6 hours after the beginning of the drawing-off operation is combined. The concentration of silica in that reaction product is 19 g/l. Transmission electron microscope investigation and investigation by light scattering show that this is a polydisperse spherical colloid whose diameters range between 8 nm and 80 nm.

EXAMPLE 2

The procedure followed is as described in Example 1, but the sol, which is drawn off in a plurality of fractions which are spaced with respect to time, is combined in such a way that, by mixing certain fractions in part or in their entirety, the result is a polydisperse silica colloid having a mean diameter by number and a polydispersity index of given values. The aim is to prepare a suspension of spherical colloidal silica having a mean diameter by number of 30 nm and a polydispersity index of 1.40.

The silica colloid which is drawn off over a period of 6 hours is accumulated, in terms of time, in the following fashion:

a first fraction brings together the silica colloid which is drawn off over a period of 2 hours 15 minutes from the beginning of the drawing-off operation (fraction I);

a second fraction brings together the silica colloid which is drawn off between 2 hours 15 minutes and 4 hours 30 minutes (fraction II); and a third fraction brings together the silica colloid which is drawn off between 4 hours 30 minutes and 6 hours (fraction III).

Nine and fifteen one hundredth liters of fraction I and 0.85 liter of fraction II are mixed. Examination under a transmission-type electron microscope of the mixture obtained and examination by light scattering show that it is a polydisperse spherical silica colloid in which the diameters are between 12 and 60 nanometers. The mean diameter by number is 31 nm and the mean diameter by weight is 44 nm. The concentration of silica is 15 g per liter.

EXAMPLE 3

The procedure is as in Example 1, but with the following modifications in the reaction conditions:

the reaction is carried out at $78°\pm1°$ C. instead of 90° C.; and the drawing-off operation is begun from the 25th minute after the beginning of the operation of simultaneously introducing aqueous sulfuric acid and aqueous sodium silicate so that a constant reaction volume of 11.3 liters is maintained in the reactor. The mean residence time in the reactor is consequently 84 minutes. That procedure thus provides a monodisperse silica colloid (colloid A) and a polydisperse spherical colloid (colloid B) during the phase of working up to a stable operating state.

Preparation of Colloid A

Colloid A is present in the reactor. Examination by means of a transmission-type electron microscope and examination by light diffusion show that it is a monodisperse spherical colloid whose diameter varies with the reaction time (determined from the beginning of the operation of simultaneously introducing the reactants) in the following fashion:

| Reaction Time (hours) | Mean Diameter In Nanometers | | $[SiO_2]$ g/l |
|---|---|---|---|
| | By Number dn | By Weight dw | |
| ½ | 8.6 | 8.8 | 6.3 |
| 1 | 11.3 | 12.2 | 10.3 |
| 2 | 17.1 | 18.0 | 14.9 |
| 3 | 23.2 | 24.9 | 17.3 |
| 4 | 30.0 | 30.9 | 18.7 |
| 5 | 39.7 | 40.3 | 19.7 |
| 6 | 51.2 | 51.7 | 21.5 |
| 7 | 69.4 | 69.6 | 22.4 |

Preparation of Colloid B

The reaction liquid which is drawn off between 2 hours 30 minutes and 5 hours 30 minutes after the beginning of the drawing-off operation is combined. Examination under a transmission-type electron microscope and examination by means of light scattering reveal that this is a polydisperse spherical colloid with diameters ranging between about 15 nm and 55 nm.

EXAMPLE 4

The procedure followed is as described in Example 1, but with the following modifications to the reaction conditions:

the reaction is carried out at 80° C. instead of 90° C.;

a more highly concentrated aqueous sodium silicate is used, that is to say, one which contains 80 g of $SiO_2$ per liter (weight ratio: $SiO_2/Na_2O$ unaltered and equal to 3.25), and an aqueous sulfuric acid containing 34 g of $H_2SO_4$ per liter is used.

At 2 hours 30 minutes after the beginning of the operation of simultaneously adding the reactants, the process yields:

in the reactor, a silica colloid containing 37 g of $SiO_2$ per liter. Investigation under a transmission-type electron microscope and investigation by light scattering reveal that it is a monodisperse spherical colloid with a mean diameter by number of 23.5 nanometers and a mean diameter by weight of 24.4 nanometers; and the reaction product which has been drawn off and accumulated since the beginning of the drawing-off operation, for a period of 2 hours 30 minutes. Examination under a transmission-type electron microscope and examination by light scattering show that this is a polydisperse spherical colloid with diameters ranging between 8 and 32 nanometers.

EXAMPLE 5

The procedure followed is as described in Example 1, but with the following modifications:

the reaction is carried out at 80° C.;

an aqueous sodium silicate with a weight ratio $SiO_2/Na_2O$ of 3.8, containing 80 g of $SiO_2$ per liter is used. The silicate solution is introduced at a rate of 67 ml per minute, and an aqueous sulfuric acid containing 34.2 g of $H_2SO_4$ per liter is used. The introduction of said acid is automatically controlled so that the pH value of the reaction medium is maintained at 9±0.2 (mean flow rate equal to 57 ml per minute).

A silicate colloid is formed in the reactor. Examination under an electron microscope and examination by light scattering show that this is a spherical colloid whose mean diameter increases with the reaction time, as determined from the beginning of the simultaneous addition operation, in the following fashion, before the stable state is attained:

| Reaction Time (hours) | Mean Diameter In Nanometers By Number dn | By Weight dw | [SiO$_2$] g/l |
| --- | --- | --- | --- |
| ½ | 6.5 | 8.3 | 11.0 |
| 1 | 10.0 | 13.5 | 21.0 |
| 2 | 16.2 | 18.5 | 32.0 |
| 3 | 26.8 | 30.5 | 37.0 |

EXAMPLE 6

The procedure is as described in Example 1 but with the following modifications:

An aqueous sodium silicate containing 40 g of $SiO_2$ per liter and with a weight ratio of $SiO_2/Na_2O$ of 3.8 is used. The solution is introduced at a mean rate of 65 ml per minute; and the drawing-off operation begins about 1 minute after the beginning of the operation of simultaneously adding the solution of acid and silicate. During that operation, the pH value of the reaction medium is maintained at 8.9±0.1 at 90° C. by the automatically controlled introduction of aqueous sulfuric acid ($[H_2SO_4]=17$ g/l). The mean residence time in the reactor is 60 minutes.

A silica colloid is formed in the reactor. Examination under an electron microscope and by light scattering show that this is a spherical colloid whose mean diameter increases with the reaction time, as reckoned from the beginning of the operation of simultaneously adding the reactants, in the following fashion, before the stable state is attained:

| Reaction Time (hours) | Mean Diameter In Nanometers By Number dn | By Weight dw | [SiO$_2$] g/l |
| --- | --- | --- | --- |
| ½ | 9.7 | 11.3 | 8.1 |
| 1 | 11.2 | 12.7 | 14.1 |
| 2 | 20.7 | 27.4 | 19.0 |
| 3 | 30.4 | 32.4 | 23.0 |
| 4 | 42.3 | 43.8 | 24.0 |

The reaction product which is accumulated over 4 hours of the drawing-off operation is a spherical colloid of silica, the diameters of which are essentially between about 8 and 50 nanometers.

EXAMPLE 7

This Example illustrates recourse to carbon dioxide as the acid. Eight liters of distilled water are introduced into the above-described reactor and raised to 90° C. Agitation is effected by means of the turbine agitator (speed of rotation 400 rpm), and the pH value is adjusted to 9.2 by the introduction of an aqueous solution of sodium silicate (weight ratio $SiO_2/Na_2O=3.25$, $[SiO_2]=20$ g/l).

The following are simultaneously introduced into the solution which is prepared in the above-indicated manner:

an aqueous sodium silicate solution with a weight ratio $SiO_2/Na_2O$ of 3.25, containing 20 grams of $SiO_2$ per liter; being introduced at a rate of 135 ml per minute, and pure carbon dioxide at a rate such that the pH value of the reaction medium is between 9.2 and 9.6 at 90° C. The mean flow rate is 37 g per hour.

That procedure results, in the reactor, in the formation and growth of a spherical silica colloid, the mean diameter of which varies with the reaction time in the following fashion before the stable state is attained:

| Reaction Time (hours) | Mean Diameter In Nanometers By Number dn | By Weight dw | [SiO$_2$] g/l |
| --- | --- | --- | --- |
| ½ | 10.0 | — | |
| 1 | 15.3 | 15.7 | |
| 2 | 21.3 | 21.4 | |
| 3 | 28.9 | 29.3 | 22.0 |

The spherical silica colloid which is present in the reactor between $t=0$ and $t=2$ hours 30 minutes has a particularly highly accentuated monodisperse character: Eighty percent of the diameters are between 25 and 30 nanometers.

EXAMPLE 8

The procedure is as described in Example 1, but with the following modifications to the mode of operation:

an aqueous solution of nitric acid containing 22 g of $HNO_3$ per liter is used as the acid, and the drawing-off operation is started 1 minute after beginning the operation of simultaneously introducing the acid and the silicate.

After 2 hours 30 minutes, the reactor contains a silica colloid with a concentration of 19 g of $SiO_2$ per liter. Examination under an electron microscope and examination by light scattering show that this is a monodisperse spherical colloid whose mean diameter by number is equal to 24 nanometers while its mean diameter by weight is equal to 25 nanometers.

In Examples 9, 10 and 11, a stainless 1 liter reactor provided with a turbine-type agitator system (1000 rpm) and a heating system is used. The reactor comprises a system for the continuous removal of the reaction liquid so as to maintain a constant reaction volume equal to 0.8 liter. Two metering pumps make it possible to introduce the reactants into the reaction liquid at two clearly separate points. The two reactants in question are:

on the one hand, aqueous sodium silicate with a weight ratio of $SiO_2/Na_2O$ of 3.25, containing 50 g of $SiO_2$ per liter, and on the other hand an aqueous solution of sulfuric acid containing 22.8 g of $H_2SO_4$ per liter.

EXAMPLE 9

An amount of 0.8 liter of distilled water is introduced into the 1 liter reactor described above, and raised to 80° C. The liquid is agitated by the agitator (1000 rpm), and the following are simultaneously introduced:

the silicate solution, at a flow rate of 20 ml per minute; and the aqueous sulfuric acid solution at a flow rate which is automatically controlled so that the pH value in the reaction medium is maintained at 8.7±0.2. The mean flow rate of the aqueous sulfuric acid solution is 20 ml per minute.

The reaction temperature is maintained at 80° C.

The operation of continuously drawing-off reaction medium is effected as soon as the operation of simultaneously introducing the two reactants is begun: under those conditions, the mean residence time in the reactor is equal to the ratio of the reaction volume to the sum of the mean flow rates of the reactants, that is to say, 0.8 liter/0.04 liter per minute = 20 minutes.

After 1 hour of operation, the reactor contains 0.8 liter of colloidal silica ($[SiO_2]=23$ g/l). Investigation under an electron microscope and by light scattering reveal that it comprises spherical particles of monodisperse colloidal silica. The diameters of the particles are between 25 and 30 nm.

EXAMPLE 10

The procedure followed is as described in Example 9 but with the following modifications:

the reaction is carried out at 75° C., the aqueous sodium silicate solution is introduced at a mean flow rate of 21.9 ml per minute, and the aqueous sulfuric acid solution is introduced at a mean flow rate of 21.9 ml per minute.

The mean residence time in the reactor is 18 minutes.

After 1 hour of operation, the reactor contains 0.8 liter of silica ($[SiO_2]=23$ g/l). Investigation under an electron microscope and investigation by light scattering reveal that it comprises spherical particles of monodisperse colloidal silica. The diameters are between 20 and 25 nm.

EXAMPLE 11

The procedure is as described in Example 9 but with the following modifications:

the aqueous solution of sodium silicate is introduced at a mean flow rate of 13.3 ml per minute; and the aqueous solution of sulfuric acid is introduced at a mean rate of 13.3 ml per minute so that the pH value of the reaction medium is maintained at a 8.7±0.2.

The mean residence time in the reactor is 30 minutes. After 1 hour of operation, the reactor contains 0.8 liter of colloidal silica. Examination under a transmission-type electron microscope and examination by light scattering show that it comprises spherical particles of monodisperse colloidal silica. The diameters of the particles are between 12 and 15 nanometers.

EXAMPLE 12

This Example uses a stainless steel reactor with a volume of 300 ml, provided with a turbine-type agitator system and a heating system. In its upper part, the reactor has a duct operating as an overflow for the continuous removal of the reaction liquid once the volume thereof exceeds 250 ml. Two hundred fifty milliliters of permuted water are introduced into the reactor and raised to a temperature of 90° C. The liquid is agitated by the turbine agitator (speed of rotation 1200 rpm) and the following are introduced into the liquid at two separate points:

an aqueous solution of sodium silicate, with a weight ratio of $SiO_2/Na_2O$ of 3.4, containing 40 g of $SiO_2$ per liter. The solution is introduced continuously at a rate of 45 ml per hour, and an aqueous solution of sulfuric acid containing 17.1 g of sulfuric acid per liter, which is introduced continuously at a rate of 45 ml per hour.

The pH value of the reaction medium is 9±0.2 at 90° C.

The mean residence time in the reactor is 2 hours 50 minutes.

Examination of the reaction liquid present in the reactor under an electron microscope and by light diffusion reveals that it is a monodisperse spherical silica colloid whose size varies in the following fashion with the reaction time, before the stable state is attained:

| Reaction Time | Range of Diameters of the Colloid |
| --- | --- |
| 4 hours 30 minutes | 15 to 20 nanometers |
| 6 hours 30 minutes | 30 to 40 nanometers |
| 9 hours | 50 to 60 nanometers |
| 16 hours | 90 to 110 nanometers |

Thus, the process effectively provides for the formation and increase in diameter of a spherical silica colloid, in a wide range of sizes.

EXAMPLE 13

A spherical silica colloid is formed continuously. The characteristics of the colloid are as follows: concentration of $SiO_2$ equal to 25 g per liter and particle diameter between 20 and 70 nanometers. For that purpose, the reactants are introduced and the reaction product is drawn off as described in Example 9 (mean residence time of 20 minutes), but the reaction is continued after 1 hour. After 4 hours of operation, a stable operating state is attained: the concentration of silica in the reactor and the characteristics of the colloid formed do not evolve any further, as is demonstrated by investigation under an electron microscope and examination by light scattering of the reaction product, performed at regular intervals between the fourth and twenty-eighth hours of operation.

The silica colloid which is continuously prepared in this way comprises spherical particles, the diameters of which range at any time between 20 and 70 nanometers.

EXAMPLE 14

A spherical silica colloid having the following features is continuously formed: concentration of $SiO_2$ of 25 g per liter and particle diameters ranging between 10 and 50 nanometers.

In this process, the reactants are introduced and the reaction product is drawn off as described in Example 10 (mean residence time of 18 minutes), but the reaction is continued after 1 hour. The stable state is reached after 4 hours of operation: the concentration of silica in the reactor and the characteristics of the colloid formed do not evolve any further, as can be seen from investigation under an electron microscope and investigation by light scattering of the reaction product, carried out at regular intervals between the fourth and one-hundredth hour of operation.

The silica colloid which is continuously prepared, in the manner described above, after the stable state has been reached comprises spherical particles, the diameters of which range at anytime between 10 and 50 nanometers. The mean diameter by number is 19 nm. The polydispersity index is 1.7.

EXAMPLE 15

A spherical silica suspension having the following characteristics is continuously prepared: concentration of $SiO_2$ of 15 g per liter and particle diameters of between 50 and 250 nanometers, in regard to the substantial part of the population.

For this process, 250 ml of distilled water is introduced into the 300 ml reactor described in Example 12; the temperature is raised to 90° C. The liquid is agitated by means of the turbine agitator (speed of rotation 1200 rpm) and the following are simultaneously added:

a dilute aqueous sodium silicate solution with a weight ratio $SiO_2/Na_2O$ of 3.4; $[SiO_2] = 30$ g/l which is introduced continuously at a rate of 45 ml per hour; and an aqueous solution of sulfuric acid $[H_2SO_4] = 12.8$ g/l ) which is introduced continuously at a rate of 45 ml per hour.

The pH value of the reaction medium is $9 \pm 0.2$ at 90° C.

The product of the reaction is continuously drawn off and is rapidly brought to ambient temperature. The mean residence time in the reactor is 2 hours 50 minutes.

After about 18 hours of reaction, a stable state is reached: the morphological characteristics of the suspension formed then do not vary substantially with the reaction time. The suspension undergoes sedimentation when it is not agitated.

The procedure then involves collecting the silica suspension produced between the 20th and 78th hours. Portions are taken off at the 24th and at the 78th hour; the product is filtered, washed and dried.

The characteristics of the silicas formed at 24 hours and at 78 hours are the same:

specific surface area as measured by adsorption of cetyl trimethyl ammonium bromide at a pH value of 9 (C.T.A.B.) = 30 $m^2/g$; and investigation under a transmission-type electron microscope and investigation by light scattering show that the substance comprises spherical particles of diameters between 50 and 250 nanometers in regard to the substantial part of the population.

EXAMPLE 16

Particles of spherical silica of a diameter between 50 and 300 nanometers are prepared continuously. The initial bottom substance comprises the reaction product of dilute sulfuric acid and aqueous sodium silicate.

The same reactor as that used in Example 12 is employed. Introduced thereinto are 192 ml of distilled water, and then 3.1 ml of concentrated aqueous sodium silicate with a ratio by weight $SiO_2/Na_2O$ of 3.4, containing 370 g of $SiO_2$ per liter.

That forms a dilute silicate solution containing 5.7 g of $SiO_2$ per liter. The solution is agitated at 90° C. followed then by the introduction of dilute sulfuric acid $[H_2SO_4] = 17.1$ g/l, at a rate of 1.7 ml per minute and for a period of 15 minutes.

After that period of time, the introduction of acid is stopped and the solution is left to mature for 30 minutes with agitation (turbine agitator rotation at 1200 rpm). The following are then simultaneously introduced:

a dilute aqueous sodium silicate solution with a weight ratio $SiO_2/Na_2O$ of 3.4; $([SiO_2] = 40$ g/l), which is introduced continuously at a rate of 45 ml per hour, and an aqueous solution of sulfuric acid $([H_2SO_4] = 17.1$ g/l) which is introduced continuously at a rate of 45 ml per hour.

The pH value of the reaction medium is $8.7 \pm 0.2$ at 90° C.

The reaction product is drawn off continuously and is rapidly brought to ambient temperature. The mean residence time in the reactor is 2 hours 50 minutes.

After about 22 hours of reaction, a stable operating state is attained: the morphological characteristics of the suspension formed $([SiO_2] = 20$ g/l) then vary little with the reaction time. The suspension undergoes sedimentation in the absence of agitation.

The process involves taking off portions of the substance at the 23rd and the 27th hours. After filtration and washing with distilled water, a silica cake is produced, which is dried in a drying oven. The silica powders produced have the following characteristics:

CTAB specific surface area = 28 $m^2/g$
BET specific surface area = 28 $m^2/g$

Examination under a transmission-type electron microscope and examination by light scattering reveal that the silica comprises spherical particles in which the substantial part of the population is of a diameter between 50 to 300 nanometers.

What is claimed is:

1. A process for the production of a silica colloid comprising:
   (a) forming a reaction medium by simultaneously adding an acidifying agent and an alkaline silicate solution to a reaction vessel;
   (b) reacting said acidifying agent and said alkaline silicate solution to form a silica colloid which is substantially monodisperse or substantially polydisperse;

(c) maintaining a constant volume of said reaction medium by drawing off a portion of said reaction medium while additional acidifying agent and alkaline silicate solution in a constant volume are added to said reaction medium, wherein said alkaline silicate is added to said reaction medium to provide a $SiO_2$ concentration that avoids agglomeration of colloidal particles; and (d) accumulating said drawn-off portion of said reaction medium to form a silica colloid which is substantially polydisperse.

2. A process as recited in claim 1 wherein said alkaline silicate solution is an aqueous sodium silicate having a ratio of $SiO_2/Na_2O$ of about 2-4.

3. A process according to claim 2 wherein said reaction medium is maintained at a temperature between about 50° and 100° C.

4. A process as recited in claim 3 wherein said reaction medium is maintained at a pH of about 8-10.

5. A process as recited in claim 4 wherein said reaction medium has a mean residence time in said reaction vessel between about 10 minutes to 3 hours and wherein said reaction medium is maintained at a temperature between about 75° and 90° C.

6. A process as recited in claim 5 wherein the drawing off of said reaction medium begins either simultaneously with or from about 1 to 25 minutes after the beginning of said simultaneous addition of said acidifying agent and said alkaline silicate solution.

7. A process as recited in claim 6 wherein said acidifying agent and said alkaline silicate solution enter said reaction vessel at two separate points.

8. A process as recited in claim 6 wherein said acidifying agent is selected from the group consisting of sulfuric acid, carbon dioxide and nitric acid.

9. A process as recited in claim 6 wherein said reaction medium is maintained at a temperature between about 80° and 90° C. and wherein said reaction medium is maintained at a pH of about 8-10.

10. A process as recited in claim 1 wherein said $SiO_2$ concentration is from about 5 g/l to about 40 g/l.

11. A process as recited in claim 1 wherein said $SiO_2$ concentration is from about 5 g/l to about 40 g/l.

12. A process as recited in claim 1 wherein said reaction vessel is a rector provided with an overflow means.

13. A process as recited in claim 12 wherein said reactor is agitated by a turbine agitator.

14. A process as recited in claim 1 wherein said $SiO_2$ concentration is substantially constant over time.

15. A process as recited in claim 1 wherein said step of reacting said acidifying agent and said alkaline silicate solution forms a silica colloid which is substantially monodisperse.

16. A process as recited in claim 15 wherein said substantially monodisperse colloid has a spherical form and a mean diameter of between 1 and 100 nm and a polydispersity index of between about 1 and 1.2.

17. A process as recited in claim 1 wherein said accumulated substantially polydisperse colloid has a polydispersity index of greater than about 1.2.

18. A process according to claim 17 wherein said polydispersity index is between about 1.2 and 4.0.

19. A process according to claim 1 wherein said accumulated substantially polydisperse colloid contains silica balls having a mean diameter between about 50 nm to about 300 nm.

* * * * *

UNITED STATES PATENT AND TRADEMARK OFFICE
CERTIFICATE OF CORRECTION

PATENT NO. : 5,236,623
DATED : August 17, 1993
INVENTOR(S) : Yvonick CHEVALLIER

It is certified that error appears in the above-indentified patent and that said Letters Patent is hereby corrected as shown below:

Claim 5, column 13, line 22, change "claim 4" to --claim 3--.

Claim 11, column 14, line 11, change "40g/1" to --50g/1--.

Claim 16, column 14, line 24, change "1" to --10--.

Signed and Sealed this

Twenty-first Day of June, 1994

BRUCE LEHMAN

Attesting Officer    Commissioner of Patents and Trademarks